July 1, 1958         V. D. MARTIN         2,841,192
PORTABLE SAW SUPPORT FOR ATTACHING IDLE SAW
TO AN EDGE-UP BOARD
Filed Dec. 30, 1955
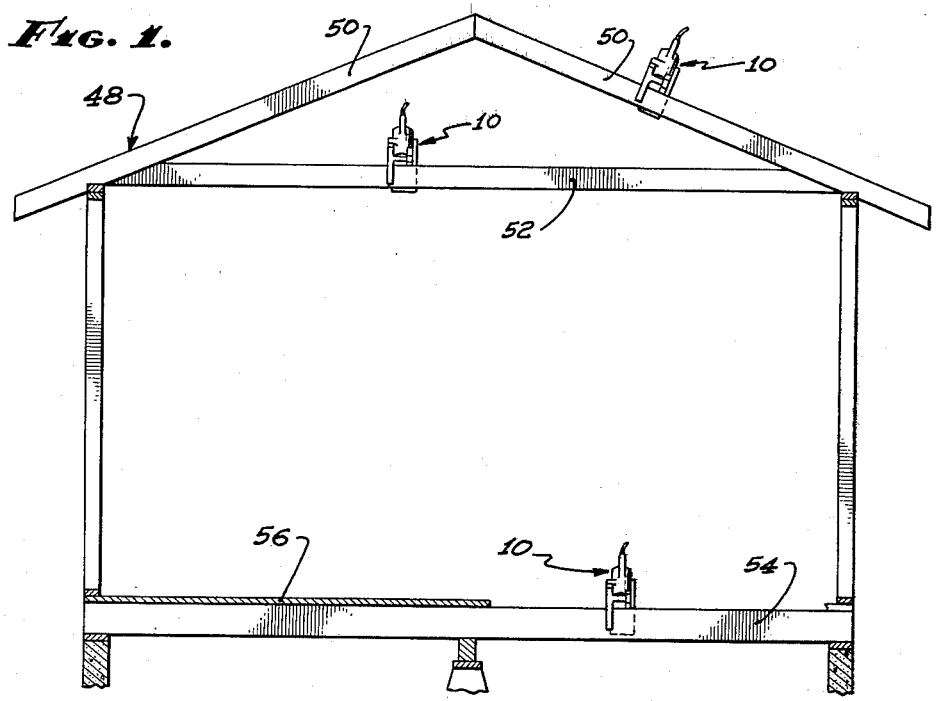
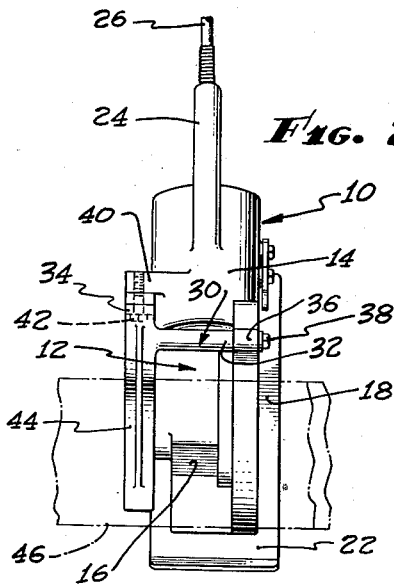
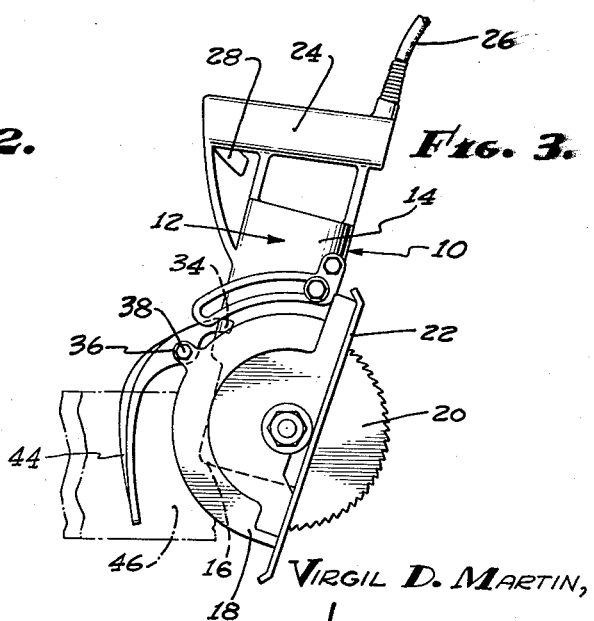

United States Patent Office 2,841,192
Patented July 1, 1958

2,841,192

PORTABLE SAW SUPPORT FOR ATTACHING IDLE SAW TO AN EDGE-UP BOARD

Virgil D. Martin, Ontario, Calif.

Application December 30, 1955, Serial No. 556,601

3 Claims. (Cl. 143—43)

My present invention relates to portable saws used for cutting wood in the building construction art, such as the commonly used "Skilsaw," and it relates particularly to a support member for such a portable saw which permits the saw to be conveniently supported when not in actual use adjacent to the operator on a member of the structure being constructed or on a sawhorse or the like.

Portable saws such as the "Skilsaw" are used extensively for cutting wood members during the construction of homes and other buildings, so that the worker may cut the wood members to size and fit them into place without moving to and from a central sawing location, and to permit the edges or ends of wooden members to be cut to size after installation.

However, it has long been a problem in the art to find a satisfactory place or means whereby the worker can set the portable saw aside when he is not actually cutting wood with the saw. Portable saws are most extensively used in constructing roofs, ceilings, floors and the like, so that the only available members upon which the portable saw can be set are the spaced rafters, ceiling joists and floor joists, or alternatively the edge of the portion of the roof, ceiling or floor which has already been constructed. There is no way of securely placing the portable saw on any of these particular members. The rafters, ceiling joists and floor joists are normally disposed approximately sixteen inches apart, and usually consist of two-by-fours, two-by-sixes or two-by-eights disposed on edge, so that the portable saw will not balance on a single one of these members, and its position when set upon a pair of the adjacent members is extremely precarious, as the saw itself is only several inches longer than the spacing between adjacent rafters or joists. It is often difficult to set the portable saw on the part of the roof, ceiling or floor that is completed, as this part is often not readily accessible, and the protrusion of the saw blade below the flat base plate of the saw makes it extremely awkward to set the saw on any flat surface.

In any of the above described conventional positions available to the portable saw there is a strong likelihood that the saw will fall and thereby become extensively damaged if the wood members upon which it is supported happen to be jarred, or if the saw is hit or the cord pulled. Since these portable saws are priced at about one hundred and fifty dollars ($150.00) or more, it is important that such damage does not occur.

In the prior art, the only satisfactory way of avoiding such precarious positioning of the portable saw was to seek a satisfactory place to set the saw which was generally not directly adjacent to the position of the worker, and which was therefore very time consuming and often dangerous to the worker because it required the worker to change positions each time he set the saw down. Attempts to set portable saws on the dirt below the flooring often fouled up the working mechanism of the saw with dirt. The conventional sawhorse was likewise not capable of supporting the portable saw, as it has a narrow upper surface. The only truly satisfactory supporting structure for a portable saw prior to the present invention was a flat surface having a slot therein for receiving the downwardly protruding circular saw blade. Such a structure was normally not accessible to the worker while he was building ceilings, roofs, floors or the like.

The present invention comprises a support extension member adapted to be integrally attached to the portable saw housing, and which extends forwardly from its integral connection to the housing in spaced relationship to the housing to permit the portable saw to be lowered from the handle at the rear of the saw onto a board disposed generally on edge so that its narrow edge becomes its top side, with the board then being disposed between the saw housing and the support extension member. This construction takes advantage of the fact that most of the structural boards used in the building art are set on edge to give the maximum structural strength to the building, and a portable saw having my support extension member integrally attached thereto can thus be quickly lowered into operative engagement with, or raised out of operative engagement from any one of a large number of boards which are easily accessible throughout the building under construction.

It is therefore an object of my present invention to provide a support extension member which may be integrally attached to a portable saw, such as the conventional "Skilsaw" to permit the portable saw to be temporarily fastened to any board that is set generally on edge.

Another object of my present invention is to provide a support extension member integrally attachable to a portable saw which will permit the portable saw to be quickly and easily temporarily fastened to rafters, ceiling joists, floor joists, sawhorses, or other boards disposed generally on edge which are normally handy to the operator during the construction of a building.

Another object of my present invention is to provide a support extension member integrally attachable to the conventional portable saw which permits the portable saw to be temporarily attached to board members disposed directly adjacent to the operator without requiring the operator to move back and forth between the job and a central sawing location or a stationary saw support member, thus saving large amounts of the operator's time and reducing hazards to the operator.

A further object of my present invention is to provide a support extension member for a portable saw which permits the portable saw to be securely temporarily fastened to any board disposed generally on edge to eliminate the danger of the saw falling when it is temporarily set aside.

Other objects and advantages of my present invention will be apparent from the following description and claims, the novelty of my invention consisting in the features of construction, the combinations of parts, the novel relations of the members and the relative proportioning disposition and operaton thereof, all as is more completely described herein and as is more particularly pointed out in the appended claims.

In the accompanying drawings, forming a part of my present specification:

Figure 1 is a vertical section of the frame of a house under construction, showing rafters, ceiling joists and floor joists and the manner in which a portable saw embodying my invention is attached to each.

Figure 2 is an elevation view showing a portable saw embodying my invention operatively engaged to a board that is shown in phantom, with the top portion of the portable saw being shown in plan view.

Figure 3 is a view similar to Figure 2, but taken from right to left in Figure 2 so as to show a side elevation of the portable saw.

Referring to the drawings, and at first to Figures 2 and 3 thereof, I have there illustrated the conventional portable saw 10, such as the commonly used "Skilsaw." The portable saw 10 includes saw body 12 having a motor housing portion 14 at its rear end and a drive housing portion 16 at its forward end. A blade housing 18 forms an integral part of saw body 12, being generally longitudinally disposed along one edge of saw body 12, and blade housing 18 encloses a circular blade 20 which extends downwardly through a slot (not shown) in base plate 22, which is a flat plate having upturned edges. Base plate 22 is adjustably pivotally mounted on a longitudinal pivoting axis (not shown) passing longitudinally approximately through the blade housing 18, to permit the cutting angle of the blade relative to the flat base plate 22 to be selectively adjusted. Base plate 22 is also adjustable about a lateral pivoting axis (not shown) passing laterally approximately through the front end of blade housing 18, whereby the base plate 22 swings downwardly about this forward axis to adjust the depth of cut of saw blade 20 below base plate 22.

It is to be noted that neither of the above pivotal adjustments of base plate 22 in any way interferes with the operation of my present invention.

The main rear handle 24 is spaced rearwardly from and integrally attached to saw body 12 in the manner best shown in Figure 3, and the usual electric power cord 26 extends rearwardly from handle 24. A trigger-type on-off switch 28 is operatively associated with handle 24.

The conventional portable saw 10 is provided with a central carrying and guide handle 30 which is laterally disposed and spaced upwardly from saw body 12 in the manner best shown in Figure 2. This carrying and guide handle 30 includes a laterally disposed rod or bar portion 32 and a downwardly and rearwardly curving attachment portion 34, the portion 34 providing the spacing of the rod or bar portion 32 from housing 16. A boss 36 extends upwardly from blade housing 18 to receive a bolt 38 which passes through boss 36 and threadedly engages the rod or bar portion 32 of handle 30. A boss 40 extends upwardly and outwardly from saw body 12 on the side of saw body 12 opposite blade housing 18, and a bolt 42 passes through the lower end of the downwardly and rearwardly curving attachment portion 34 of handle 30 and threadedly engages the motor housing boss 40. In this manner, the central carrying and guide handle 30 is securely bolted to the saw body 12 at both of its ends.

In the conventional portable saw 10 the central carrying and guide handle 30 is disposed slightly forward of the center of mass of the saw 10, so that the saw 10 can readily be carried by means of handle 30.

In the preferred embodiment of my present invention I provide a support extension member 44 which forms and integral part of the handle 30, curving forwardly from handle 30 about five and one half or six inches. It will be seen from Figure 2 of the drawings that my preferred support extension member 44 extends directly forwardly from the attachment portion 34 of handle 30 which connects to the housing boss 40. Thus, my support extension member 44 in my preferred embodiment is on the side of saw body 12 opposite to the blade housing 18, with support extension member 44 being directed forwardly from handle 30 substantially parallel to the alignment of blade housing 18.

As is shown in Figure 3 of the drawings, my preferred support extension member 44 extends forwardly and upwardly from the rod or bar portion 32 of handle 30, then curving back downwardly toward the drive housing portion 16 of saw body 12, so that the forward end of support extension member 44 curves downwardly or inwardly toward the drive housing portion 16 of saw body 12.

By this construction of my support extension member 44, a board, such as the board 46 shown in phantom in Figures 2 and 3, will fit between my support extension member 44 on one side of the board, and drive housing 16 and blade housing 18 of the saw body 12 on the other side of the board. Thus, when any board, such as the board 46, is disposed generally on edge in the manner of board 46 in Figures 2 and 3, the portable saw 10 may be easily attached to the board 46 by merely suspending the portable saw 10 from main rear handle 24 and then engaging the portable saw 10 to board 46 in the manner shown in Figures 2 and 3 with the board being disposed between support extension member 44 on the one side of the board, and drive housing 16 and blade housing 18 on the other side of the board. Since the center of mass of the portable saw 10 is disposed above support extension member 44 in Figures 2 and 3, and considerably to the right of support extension member 44 in Figure 3, the portable saw 10 will tilt somewhat to the right in Figure 3. Thus, saw 10 is tightly held in its operative engagement with board 46 by a torsional engagement with board 46, support extension member 44 engaging one side of board 46 with considerable force and housings 16 and 18 engaging the other side of board 46 with considerable force.

Saw 10 can be readily disengaged from its operative position on board 46 by merely raising the saw from handle 24, which relieves the torsion of saw 10 on board 46 and permits the saw to be easily withdrawn.

Although my preferred support extension member 44 forms an integral part of the central carrying and guide handle, it is to be understood that my support extension member 44 may be otherwise attached to the saw body 12 by any suitable means which will provide a strong, integral attachment. The reason why I prefer to provide support extension member 44 as an integral part of handle 30 is that the conventional handle 30 may be quickly and easily removed from its operative position on portable saw 10 by removing the two bolts 38 and 42, and this conventional handle 30 may be replaced by the new handle 30 having the integral support extension member 44 formed thereon. In this manner, all existing portable saws of the general type shown in the drawings can be fitted with my support extension member 44 by merely removing the old handle 30 and replacing it with a new handle 30 having my support extension member 44 thereon. Similarly, new portable saws from the factory may be provided with handle 30 having my integral support extension member 44 without requiring a redesign of the saw body 12.

My preferred embodiment of my support extension member 44 as shown in the drawings is so compact and closely related to the saw body 12 that even with my support extension member 44 installed, the conventional saw 10 will still fit in its carrying box (not shown). The preferred embodiment of my present invention has the further advantage that it provides an excellent guide arm to be gripped by one hand of the operator while performing actual sawing operations. It also provides a very convenient handle to be gripped by the operator when carrying the saw from one position to another.

In Figure 1 of the drawings I have shown a vertical section of the frame 48 of a partially completed house in order to illustrate typical convenient places on the house frame 48 where a portable saw embodying my invention can be temporarily supported.

I prefer to support the portable saw 10 on one of the rafters 50 in the manner shown in Figure 1 while the roof (not shown) is being constructed. In this manner various sections of the roof can be cut on the job, and the portable saw 10 can be placed at any desired position along the length of any one of the rafters 50 while not actually being used. It will be noted that the rafters 50 shown in Figure 1 have a substantial slope. However, this does not in any way interfere with the firm grip of the portable saw embodying my invention on the rafters.

Such rafters 50 are generally constructed from two-by-fours or two-by-sixes.

Similarly, I have shown a portable saw embodying my invention operatively engaged to a conventional two-by-four or two-by-six ceiling joint 52 in Figure 1, the ceiling joists 52 being the handiest places to attach the portable saw 10 during construction of the ceiling (not shown).

In the same manner, I prefer to anchor the portable saw 10 embodying my present invention to one of the floor joists 54 during construction of the floor 56. The floor joists 54 are usually two-by-sixes or two-by-eights.

Although the spacing between my support extension member 44 and drive housing 16 and blade housing 18 is sufficient to permit a board two inches thick to slide between these members in the manner shown in Figures 2 and 3, it is to be understood that boards of various other thicknesses can be accommodated by my present invention. For example, with my normal spacing of support extension member 44 from the saw body 12, boards which are only one inch thick or which are one and one half inches thick can be satisfactorily accommodated. If a portable saw must be attached to boards that are more than two inches thick my support extension member 44 may accordingly be disposed slightly farther from the drive housing 16 and blade housing 18.

It is to be understood that the form of my invention herein shown and described is my preferred embodiment and that various changes in the shape, size and arrangement of the parts may be resorted to without departing from the spirit of my invention, or the scope of my appended claims.

I claim:

1. A support member for a portable power saw having a body portion, a blade housing longitudinally disposed along one side of the body, a rear main handle extending rearwardly from the body and a laterally disposed central handle connected at one end to the blade housing and at the other end to the opposite side of the saw body from the blade housing, said support member including an elongated support arm integral with said central handle adjacent to the side of the saw body opposite to said blade housing, said support arm extending forwardly longitudinally adjacent to the saw body along the side of the saw body opposite to said blade housing and being spaced from the saw body to receive a board between said arm on one side of the board and the saw body and blade housing on the other side of the board.

2. A combined handle and support member for a portable power saw having a body portion, including a support member base portion, means for attaching said base portion to the saw body at one side of the saw body, an arm integral with said base portion which extends upwardly and forwardly from said base portion along the side of the saw body to which said base portion is attached in spaced relation to the saw body to receive a board between said arm and the saw body, and a handle integral with said arm and extending laterally from said arm to the opposite side of the saw body.

3. A combined handle and support member for a portable power saw having a body portion and a blade housing longitudinally disposed along one side of the body, including a support member base portion, means for attaching said base portion to the saw body at the side of the saw body opposite to said blade housing, an arm integral with said base portion which extends upwardly and forwardly from said base portion along the side of said body opposite to the blade housing in spaced relation to the saw body to receive a board between said arm and the saw body, and a handle integral with said arm and extending laterally from said arm to said blade housing, said handle being operatively connectable to said blade housing.

References Cited in the file of this patent

UNITED STATES PATENTS

| | | |
|---|---|---|
| 364,049 | Seargeant | May 31, 1887 |
| 869,947 | Tupper | Nov. 5, 1907 |
| 1,740,074 | Crowe | Dec. 17, 1929 |
| 1,848,330 | Emmons | Mar. 8, 1932 |
| 1,897,248 | Ferguson | Feb. 14, 1933 |
| 2,634,767 | Chappell | Apr. 14, 1953 |
| 2,671,476 | Richards et al. | Mar. 9, 1954 |
| 2,707,610 | Fillion et al. | May 3, 1955 |